Feb. 13, 1951 — G. M. TEEL — 2,541,307
FISHING SIGNALING DEVICE
Filed Sept. 24, 1949
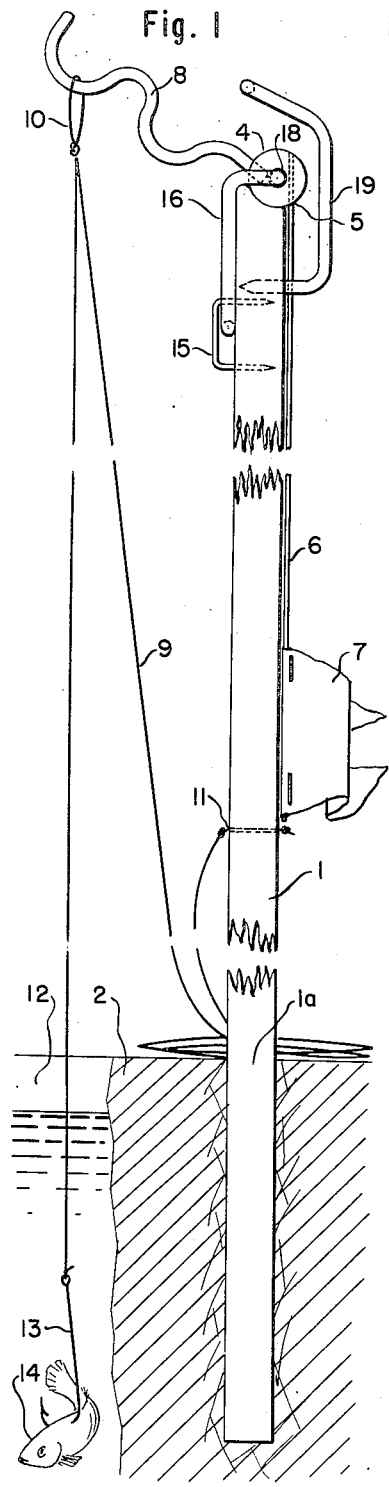
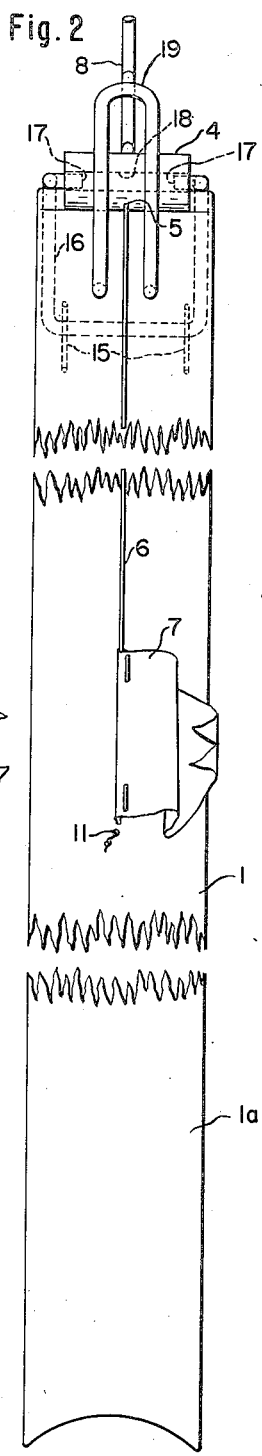
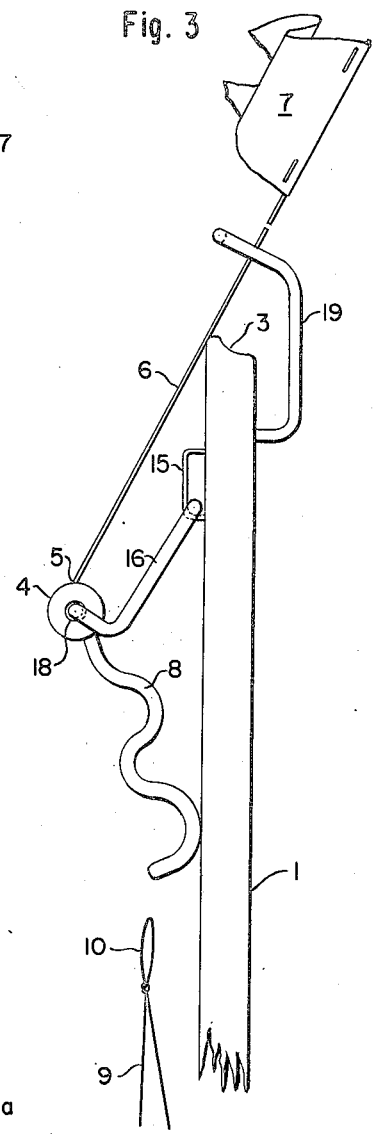
INVENTOR.
GEORGE M. TEEL
BY *John A. McManus*
ATTORNEY Patented Feb. 13, 1951

2,541,307

UNITED STATES PATENT OFFICE 2,541,307

FISHING SIGNALING DEVICE

George M. Teel, Danvers, Mass.

Application September 24, 1949, Serial No. 117,551

1 Claim. (Cl. 43—17)

The present invention relates to new and useful improvements in fishing signaling devices, whereby the fish line may be set and notice given when a fish has taken the hook, and it may be so constructed and arranged to be used in winter and summer.

The particular object of my invention is to provide a device of the character described which may be manufactured economically without the need for springs, and which may be of the tiltable or tippable type, and adapted to be readily inserted through the ice for ice fishing.

Another object of my invention is to provide a device which may be adapted to the use of live bait without actuating the signalling means until a pull is exerted on the fish line in excess of that exerted by a live bait attached to the fish hook.

The above and other advantages of my invention will appear in greater detail as the specification proceeds.

An illustrative embodiment of my invention is shown in the accompanying drawing, wherein Figure 1 represents a side elevation and Fig. 2 a front elevation of my improved device in the "set" or untripped position, both views being partially broken away; and Fig. 3 represents a side view of said device in the tripped position.

Referring more specifically to the drawing, in Fig. 1, 1 represents a baseboard or stake, the lower part 1a of which may be inserted in the ice 2. A shelf or rest 3, (best illustrated in Fig. 3) is provided upon which normally rests, preferably, a cylindrically shaped weight 4. To the weight 4, is attached at 5, a signal-arm 6, and attached to said signal-arm is a flag 7. Attached to another part of the cylindrical weight member is a trigger or fish line-receiving member 8. When the weight 4, and the trigger 8, are in the "set" or untripped position shown in Figure 1, a fish line 9, is attached to said trigger 8, by means of the looped portion 10, of the fish line, one end of the line being suitably fastened to the baseboard or stake 1, as shown at 11 (Fig. 1). The other end of the fish line extends through a hole 12, in the ice and carries a fish hook 13, at the end thereof, which is dropped through the hole in the ice. The hook 13, may be baited with a live bait 14. Fastened to the stake 1, by means of staples 15, is a closed link member 16, having ends 17 (Fig. 2) which are secured in a central opening 18, in the weight 5. A bifurcated guide member 19, is carried by the stake 1, at the top end of the latter and serves as a guide to direct and limit the movement of the signal-arm 6, when the trigger 8, trips weight 5. Weight 5, and trigger 8, are so proportioned in weight and leverage that the pull of the live bait 14, on hook 13, will not cause weight 5, to drop from shelf 3, unless there is a "strike."

The operation of my invention is as follows: Assuming that the device has been set for ice fishing, as illustrated in Fig. 1, and consequently with weight 5, resting on shelf 3, of stake 1, and that the fish hook 13, has been "struck," trigger 8, will be pulled down, causing weight 5, to drop from shelf 3, thus raising signal-arm 6. Signal-arm 6, being attached to weight 5, will be restrained in its maximum travel by the bifurcated guide member 19; also, the extent of drop of weight 5, will be governed by link 16, and staples 15, to which said link is attached. Flag 7 will now be raised, and the position of the respective parts will be as illustrated in Fig. 3. When it is again desired to reset the signaling device for another "strike" the weight 5 is again placed on the shelf 3, and the respective parts restored to the relationship illustrated in Figs. 1 and 2.

What I claim as new and desire to secure by Letters Patent of the United States is:

In a fishing signaling device, a baseboard having a shelf adapted to receive a weighted member, a movable weighted member normally resting on said shelf, a signal-arm and a fishline-receiving member comprising a trigger attached to the weighted member and the latter adapted to be actuated by a pull on the line to drop the weighted member from the shelf and raise the signal-arm, a guide member carried by the baseboard adapted to guide and limit the movement of the signal-arm in relation to said baseboard, a link-retaining staple carried by the baseboard, and a loose-link connection attached at one end to the weighted member and at the other end to the link-retaining staple on the baseboard.

GEORGE M. TEEL.

REFERENCES CITED

The following references are of record in the file of this patent:

UNITED STATES PATENTS

| Number | Name | Date |
|--------|------|------|
| 75,075 | Talbot | Mar. 3, 1868 |
| 1,729,646 | McCurley | Oct. 1, 1929 |